United States Patent [19]

Robbins, III

[11] Patent Number: 4,982,869
[45] Date of Patent: Jan. 8, 1991

[54] PIVOTING HANDLE TYPE PITCHER FOR THIN WALLED CONTAINER

[76] Inventor: Edward S. Robbins, III, 459 North Ct., Florence, Ala. 35630

[21] Appl. No.: 530,417

[22] Filed: May 30, 1990

Related U.S. Application Data

[63] Continuation-in-part of Ser. No. 432,672, Nov. 7, 1989.

[51] Int. Cl.⁵ .......................................... B65D 23/10
[52] U.S. Cl. ................................. 220/404; 220/85 H; 215/100 A; 294/31.2
[58] Field of Search .............. 220/404, 85 H, 91, 92, 220/94 R, 95, 96; 215/100 A; 294/27.1, 33, 31.2

[56] References Cited

U.S. PATENT DOCUMENTS

| Des. 186,555 | 11/1959 | Hunt | D58/26 |
|---|---|---|---|
| Des. 292,160 | 10/1987 | Thomas | D7/70 |
| 535,550 | 0/1895 | Müller | 215/12.1 |
| 547,713 | 10/1895 | Courtenay | 215/100 A |
| 704,972 | 7/1902 | Griffith | 215/12.1 |
| 770,528 | 9/1904 | Kestner | 215/12.1 |
| 965,629 | 7/1910 | Holz | 294/28 |
| 1,468,808 | 9/1923 | Hamilton | 215/12.1 |
| 1,702,555 | 2/1929 | Watson | 248/145.6 |
| 1,843,325 | 2/1932 | Kappelly | 215/12.1 |
| 2,463,651 | 3/1949 | Stevens | 294/33 X |
| 2,838,226 | 6/1958 | Hartmann et al. | 229/90 |
| 2,859,891 | 11/1958 | Carkin | 215/11 |
| 2,867,364 | 1/1959 | Bramante | 224/45 |
| 2,928,570 | 3/1960 | Fitch | 220/85 |
| 3,061,129 | 10/1962 | Fitzgerald | 215/11 |
| 3,092,277 | 6/1963 | Brim | 215/13 |
| 3,202,309 | 8/1965 | Simpson | 215/100 |
| 3,255,932 | 6/1966 | Hunter et al. | 222/183 |
| 3,402,843 | 9/1968 | Campbell | 215/100 |
| 3,606,962 | 9/1971 | Scholle | 222/105 |
| 3,610,671 | 10/1971 | Conger | 294/33 |
| 3,688,936 | 9/1972 | Killigrew | 215/100 |
| 4,300,612 | 11/1981 | Schroeder, Jr. et al. | 150/52 R |
| 4,379,578 | 4/1983 | Schuler | 294/31.2 |
| 4,486,043 | 12/1984 | Rais | 294/27 H |
| 4,511,167 | 4/1985 | Kawaguchi | 294/28 |
| 4,552,396 | 11/1985 | Rais | 294/27.1 |
| 4,653,671 | 3/1987 | Duffy et al. | 222/105 |
| 4,660,876 | 4/1987 | Weldin et al. | 294/33 |
| 4,666,197 | 5/1987 | Watson et al. | 294/31.2 |
| 4,667,359 | 5/1987 | Polotti | 294/31.2 X |
| 4,671,427 | 6/1987 | Farquharson | 222/83.5 |
| 4,896,913 | 1/1990 | Kennedy | 294/31.2 |

*Primary Examiner*—Steven M. Pollard
*Attorney, Agent, or Firm*—Nixon & Vanderhye

[57] ABSTRACT

A carrier assembly for thin walled containers is provided which includes upper and lower carrier portions. The lower portion includes an open-top bucket like member and the upper portion includes a pair of straps extending away from a container neck engaging portion. The straps may be secured to the lower carrier portion for pivotal movement between a container loading/unloading position and a container neck engaging position. A combination carrier and thin walled container assembly is also provided.

40 Claims, 3 Drawing Sheets

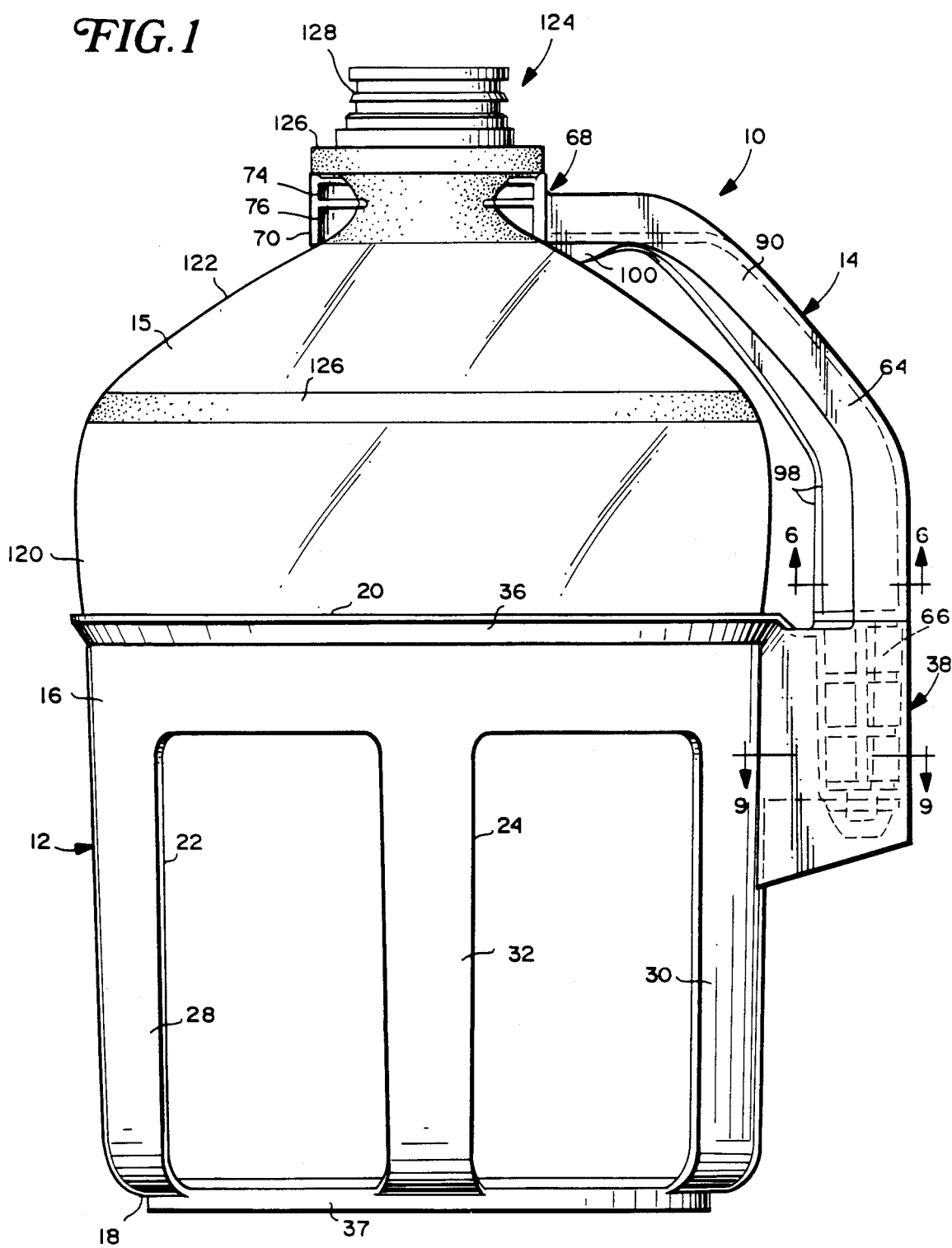

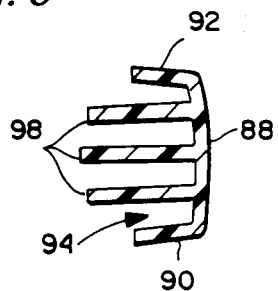
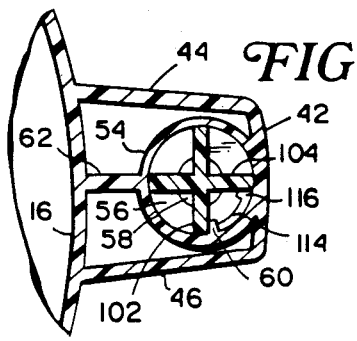
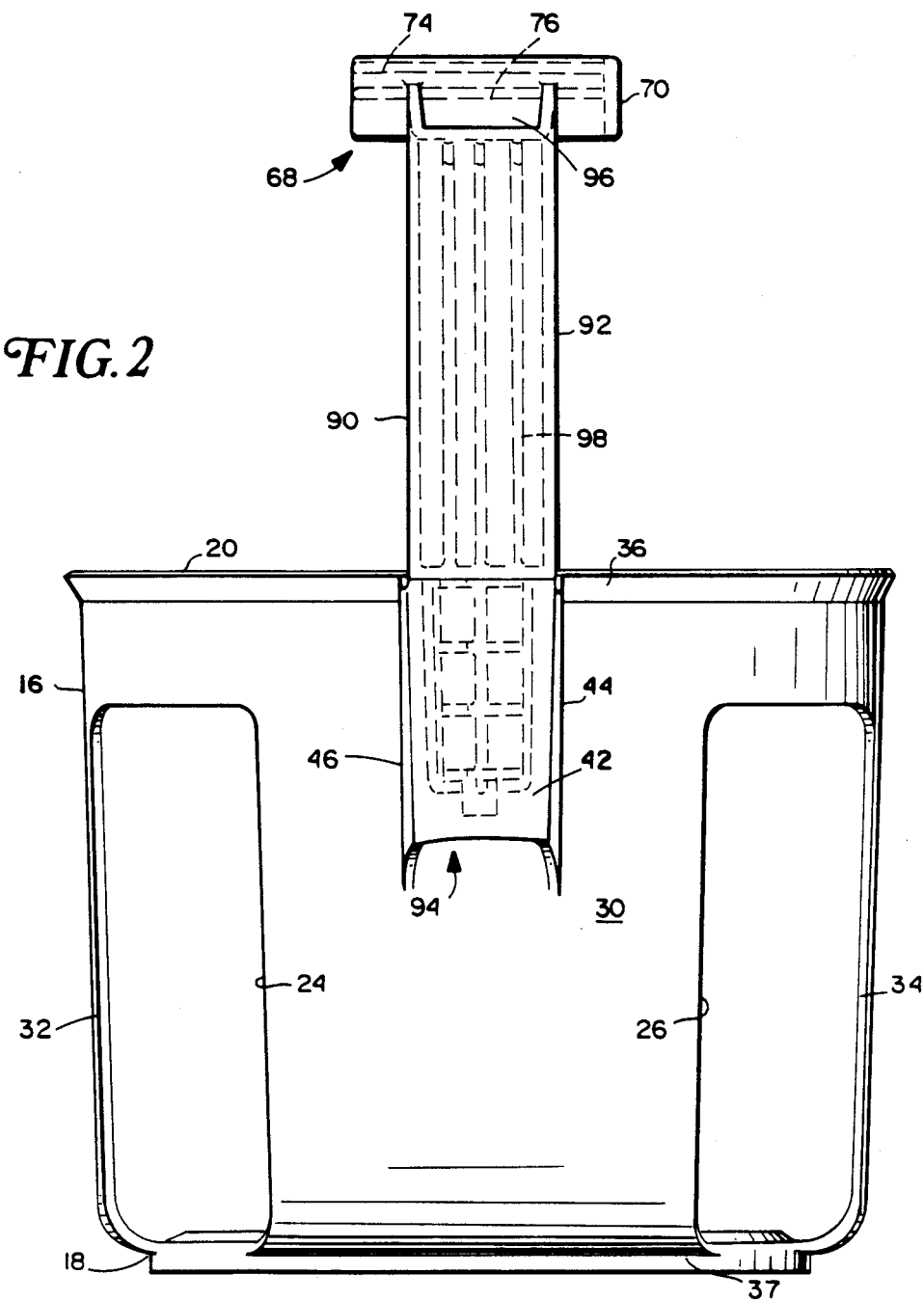

PIVOTING HANDLE TYPE PITCHER FOR THIN WALLED CONTAINER

RELATED APPLICATIONS

This application is a continuation-in-part of my earlier filed co-pending U.S. patent application Ser. No. 07/432,672 filed on Nov. 7, 1989, and entitled "Composite Container and Associated Carrier", the disclosure of which is hereby expressly incorporated by reference.

This application is also related to my co-pending U.S. patent application Ser. No. 07/533,418, filed on May 30, 1990, now U.S. Pat. No. 4,982,868, and entitled Bail Type Pitcher For Thin Walled Containers.

FIELD OF THE INVENTION

This invention generally relates to thin walled, flexible and collapsible containers and associated carriers for such containers, which are useful for holding various materials, including liquid foodstuffs (milk, water, juice, etc.), other non-foodstuff liquids (dish and laundry detergent, etc.), viscous liquids and non-liquid flowable material (powders, granules, salts, etc.). More specifically, the present invention relates to a relatively rigid reusable container carrier which is adapted to receive and hold a flexible, collapsible container in nested relationship, and which enables the consumer to conveniently use and then dispose of an empty thin walled container, and replace it with a similar, filled container, or refill container.

BACKGROUND AND SUMMARY OF THE INVENTION

There is great concern in government and in the food packaging industry for potential environmental hazards associated with disposable plastic containers used in the packaging and sale of beverages such as milk, water, juice, etc., other liquids or semi-liquids (viscous liquids) such as detergents, ketchup, etc., as well as flowable non-liquids such as powders, granules, and salts, etc. It has been estimated, for example, that in the dairy industry alone, as much as 500 million pounds of plastic are required each year for consumer oriented container applications, virtually all of which eventually finds its way to landfills and/or other waste sites. Significant amounts of scrap plastic are also produced by the manufacture of such large amounts of plastic, thereby also contributing to the waste problem. The thin walled container assemblies of my above identified parent application alleviate this problem to the extent of reducing the plastic required to form, for example, a one-gallon container by about fifty percent.

In order to fully utilize the advantages of the thin walled, flexible and disposable containers as described in my above identified parent application, it is desirable to provide a carrier which will securely hold the thin walled container during use, and particularly during pouring. In other words, while the thin walled containers of my parent application are sufficiently strong as to be sold separately as replacements or refills on the shelf with no supporting carrier, the use of the container and particularly the pouring of contents therefrom is made easier and less prone to spilling, because the user need not directly grasp the flexible sidewall of the container.

In accordance with this invention, therefore, a carrier device with an integral handle is provided for receiving and holding a thin walled, flexible and collapsible container. The carrier may be a one-time purchase, or at least a seldom purchased item for the consumer, to be used repeatedly with subsequently purchased refills, while the empty thin walled container itself may be disposed of after use in the normal fashion.

In one exemplary embodiment of the invention, the carrier includes relatively rigid lower and upper portions. The lower portion includes a generally cylindrical bucket-like member including a peripheral side wall and a bottom wall. The upper end of the lower portion is open and terminates in an upper peripheral edge.

In this exemplary embodiment, the upper carrier portion includes an elongated, relatively rigid strap portion (which also serves as a handle) which is pivotally connected at one end to the lower carrier portion, and is provided at its other end with a container neck engaging portion.

The one end of the strap portion includes a pivot pin portion which is received within a bracket provided at the upper end of the lower carrier portion, to thereby permit pivotal movement of the upper carrier portion about a vertical axis between a container loading/unloading position and a container neck engaging position.

The pivot pin portion and bracket configuration includes cooperable stop elements for limiting the pivoting movement of the upper carrier portion to about 90°, (the arcuate distance between the two above noted positions) and for releasably holding the upper carrier portion in either of these positions.

The container neck engaging portion of the upper carrier portion is designed to snugly engage the container neck just below an outwardly directed radial flange of the thin walled container.

The above described arrangement provides a unique, easy to use thin walled container carrier which is adapted for relatively permanent use, i.e., it is designed to be used repeatedly with thin walled container refills.

Thus, in accordance with a broader aspect of the invention, a thin walled container carrier is provided which comprises (a) a lower carrier portion including a peripheral sidewall, a bottom wall, and an upper peripheral edge; and (b) an upper carrier portion including a relatively rigid handle portion pivotally mounted at one end to the lower container carrier portion, and provided with a container neck engaging portion provided at the other end, the upper carrier portion being pivotable about a vertical axis.

In a related aspect, this invention relates to a combination thin walled container and thin walled container carrier assembly which comprises (a) a container carrier including a lower portion having a peripheral sidewall, a bottom wall, and an upper peripheral edge; an upper portion including a handle portion having a lower end pivotably secured in the lower portion for swinging movement about a vertical axis, and including a container neck engaging portion at an upper end of the handle portion; and (b) a flexible and collapsible container adapted to be carried by the carrier assembly, and having a relatively thin peripheral side wall, a bottom wall and a top wall, the top wall having an integrally formed neck portion including closure receiving means formed thereon.

Other objects and advantages of the invention will become apparent from the detailed description which follows.

BRIEF DESCRIPTION OF THE DRAWINGS

FIG. 1 is a side elevation of a container carrier assembly and thin walled flexible container in accordance with one exemplary embodiment of the invention;

FIG. 2 is a rear elevation of the carrier assembly of FIG. 1, but with the container removed;

FIG. 6 is a cross section taken along the line 6—6 of FIG. 1;

FIG. 9 is a cross section taken along the line 9—9 shown in FIG. 1.

DETAILED DESCRIPTION OF THE DRAWINGS

Figure 4:
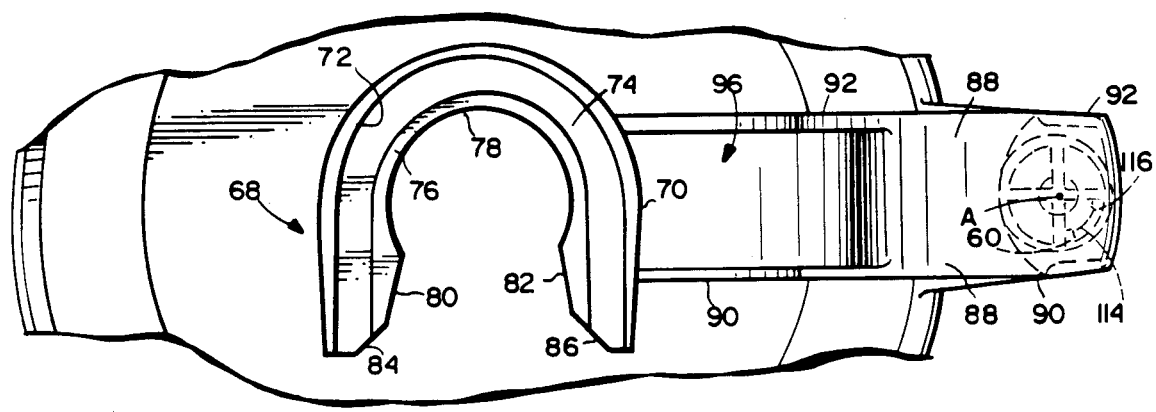
FIG. 4 is a partial plan view of the container carrier portion shown in FIG. 1.

The container carrier assembly 10 in accordance with an exemplary embodiment of this invention includes a lower carrier portion 12 and an upper carrier portion 14, specifically adapted to hold a thin walled flexible and collapsible container 15. The lower carrier portion 12 includes a generally cylindrical bucket-like member having a substantially cylindrical peripheral side wall 16, a bottom wall 18, and an upper annular peripheral edge 20. In order to reduce the overall weight of the lower carrier portion 12, and in order to reduce the amount and hence the cost of material required, four relatively large and generally rectangularly shaped cut-outs, three of which are shown at 22, 24 and 26, are provided substantially symmetrically in the peripheral side wall 16. This arrangement leaves two relatively large solid areas 28 and 30 and two relatively narrow solid areas 32 and 34 of the peripheral wall 16.

The upper open end of the lower carrier portion 12 is provided with an outwardly flared surface 36 terminating at the edge 20. The lower end of the lower carrier portion has an annular rib 37 depending from the bottom wall 18 to thereby provide a rigid support for the lower carrier portion.

The upper end of the lower carrier portion is also provided with a bracket 38 located just below the peripheral edge 20 on the peripheral side wall 16.

Figure 3:
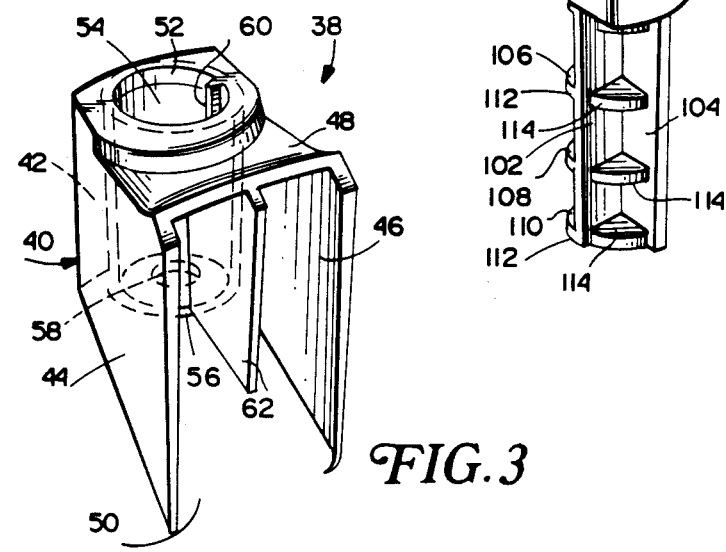
FIG. 3 is a perspective view of a mounting bracket provided on the lower carrier portion, but removed therefrom for the sake of clarity.

The bracket 38, which may be molded integrally with the side wall 16, or made of individual components separately welded or glued together and to the side wall 16, is best seen in FIG. 3 and includes a substantially hollow housing portion 40 including a rear wall 42, side walls 44, 46, a top wall 48 and an open lower end 50. The top wall 48 is formed with an opening 52 which merges with a substantially cylindrical sleeve 54 depending therefrom. Sleeve 54 has a lower end 56 with an aperture 58 centrally located therein. The sleeve 54 thus forms a recess in the bracket 38 for a purpose described in more detail below. An elongated rib or stop 60 extends along the length of the recess, on an interior surface of the sleeve.

As may be appreciated from FIGS. 1, 2 and 3, the bracket 38 is joined to the peripheral side wall 16 along the forward edges of walls 44 and 46, and along a contoured edge of the top wall 48 which joins to the peripheral side wall along the flared surface 36. A further point of attachment is provided by an intermediate wall 62 extending between the sleeve 54 and the side wall 16 intermediate the walls 44, 46. The wall 62 serves not only to assist in the secure engagement of the bracket 38 to the side wall 16, but also to brace the sleeve 54 against any lateral movement.

The upper carrier portion 14 comprises a handle portion 64, a pivot pin portion 66 and a container neck engaging portion 68.

The container neck engaging portion 68 has a generally inverted U-shape, depending on the direction of observation. For consistency, and with reference to FIG. 4, the container neck engaging portion 68 will be referred to as having a substantially inverted U-shape in plan. It is important to note that the neck engaging portion 68 opens in a direction which permits the upper carrier portion 14 to be rotated about a vertical axis A (FIG. 4) which extends through the center of sleeve 54, into and out of a container neck engaging position as described further below. The axis A extends parallel to a center axis of the carrier, i.e., both axes lie in a vertical plane.

The neck engaging portion 68 of the upper carrier portion 14 is formed with a substantially vertical wall 70 which is joined to one end (the upper end) of the handle portion 64. The interior surface 72 of the wall 70 is provided with two vertically spaced, horizontal ribs 74, 76. The upper rib 74 has a shape corresponding substantially to the curvature of the vertical wall 70. The lower rib 76 has a first portion 78 which has an arcuate surface, the radius of curvature of which substantially corresponds to the adjacent radius of curvature of an associated container neck. At opposite ends of the arcuate portion 78 are flared portions 80, 82 with bevelled entry portions 84, 86, respectively, which serve as guide edges during pivotal movement of the upper carrier portion 14 into the container neck engaging position as described below. As will be appreciated from FIG. 4, the lower rib 76 extends radially inwardly a greater extent than the upper rib 74. This arrangement permits the ribs 74, 76 to generally conform to the container neck as best seen in FIG. 1.

The handle portion 64 of the upper carrier portion 14 is formed by a relatively smooth main wall surface 88 and a pair of side walls 90, 92 which are molded to provide a first channel shaped area 94 on the underside of the handle portion, as best seen in FIGS. 2, and 4 through 6. Extending perpendicularly from the underside of wall surface 88, beyond the side walls 90, 92, are a set of three ribs or vanes 98 which extend from the pivot pin portion 66 to the container neck engaging portion 68. While the above described handle portion provides for secure gripping of the carrier by the user, it will be appreciated that the handle portion 64 can have a variety of surface configurations which are intended to be within the scope of this invention.

Of significance, however, is the projection 100 formed on each of the three interior ribs or vanes 98 at the upper end thereof adjacent the vertical wall 70. These projections 100 are designed to engage a shoulder portion of the container 15 as best seen in FIG. 1. This arrangement serves to provide stability and support to the shoulder area of the container, particularly during pouring, so as to prevent undue stresses on the container neck.

The lower end of the handle portion 64 of the upper carrier portion 14 terminates at the pivot pin portion 66 which is adapted to be received within the sleeve 54 of the bracket 38. Specifically, the pivot pin portion 66 is molded to include a pair of vertically extending ribs 102, 104 disposed at right angles to one another, and with a plurality of disk-like horizontal members 106, 108, 110 vertically spaced along the ribs 102, 104.

Figure 5:
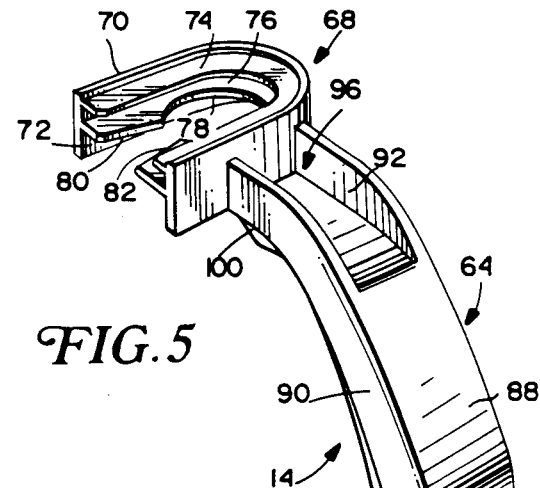
FIG. 5 is a perspective view of the upper carrier portion of the assembly shown in FIG. 1.
Figure 7:
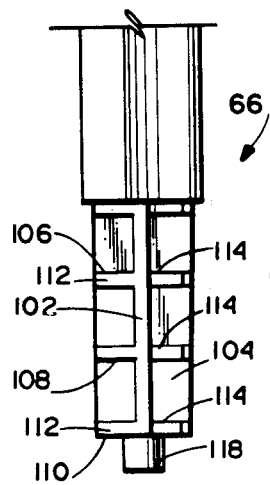
FIG. 7 is a partial elevation of the pivot pin portion of the upper carrier portion shown in FIG. 5.
Figure 8:
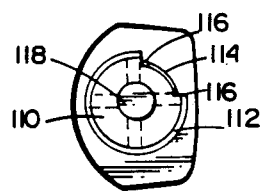
FIG. 8 is a bottom view of the partial elevation shown in FIG. 7.

The disk-like members 106, 108, 110 each have annular peripheral edges 112 which are flush with the edges of ribs 102, 104 with the exception of segments 114, best seen in FIGS. 5, 7 and 8, which are recessed from the edges of ribs 102, 104. Segments 114 are each provided with detents 116 at either end of the substantially 90° arcuate surface defining the segments. The segments 114 insure that edges of the ribs 102, 104 will serve as limit stops during rotation of the upper carrier portion between container loading/unloading and container neck engaging positions as described below.

The lowermost end of pivot portion 66 terminates with a small diameter pivot pin 118. Thus, by inserting the pivot pin portion 66 of the upper carrier 14 into the mounting bracket 38 so that pin 118 sits in hole 58, and segments 114 straddle the rib or stop 60, swinging movement of the upper carrier portion may be effected through about 90° from a first container loading/unloading position (with rib 102 engaging rib 60) to a container neck engaging position (with rib 104 engaging rib 60). The detents 116 which resiliently receive the rib or stop 60, serve to releasably hold the upper carrier portion in either of the two above noted positions. As best seen in FIG. 1, the pin 118 may be retained in hole 58 by means of a conventional retainer cap 119.

The thin walled container 15 may be substantially as shown and described in my above identified parent U.S. patent application Ser. No. 07/432,672 with slight variations in shape as described below. Briefly, the container 15 includes a peripheral side wall 120, a bottom wall (not shown) and a tapered or domed shoulder 122 terminating at an upstanding neck or dispensing portion 124. The container may include a textured reinforcing area 126 extending about the periphery of the container where the side wall 120 merges with the shoulder 122. The neck 124 includes a pronounced radially outwardly directed flange 126 (which may be solid or hollow). From FIG. 1, it may be appreciated that the ribs 74, 76 are adapted to engage the neck 124 below the flange 126. At the same time, when fully engaged, the lower edge of wall 70 as well as the projections 100 rest on the shoulder 122, as best seen in FIG. 1.

With reference to FIGS. 1 and 4, it will be appreciated that the container neck 124 is engaged by rib 76 by, in effect, snapping the upper carrier portion into place by reason of the fact that arcuate portion 78 of the rib 76 extends arcuately slightly more than 270°. This snug engagement permits easy pouring without fear of any undesirable relative movement between the container 15 and carrier 10. The neck portion 124 terminates at a closure receiving area 128 which may include exterior threads for receiving a conventional screw-on type closure (not shown).

In use, it will be appreciated from the above description that, when the upper carrier portion 14 is attached to the lower carrier portion 12 with the pivot pin portion 66 secured within the bracket 38, the upper carrier portion may be pivoted about axis A to a container loading/unloading position wherein the upper carrier portion is rotated out of the area of the lower cylindrical carrier portion. Upon insertion of a filled container 15 into the lower carrier portion 12, the upper carrier portion 14 may then be rotated to a container neck engaging position, with the container neck engaging portion 68 in full engagement with the container neck 124 as shown in FIG. 1. By reversing the above described movement, the upper carrier portion 14 can be moved back to a container loading/unloading position when the container 15 is empty to facilitate removal of the empty container and loading of a refill.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A container carrier assembly comprising:
   (a) a lower carrier portion including a peripheral sidewall, a bottom wall, and an upper peripheral edge;
   (b) an upper carrier portion including a relatively rigid handle portion pivotally mounted at one end to said lower carrier portion, and provided with a container neck engaging portion provided at the other end, said upper carrier portion being pivotable about a vertical axis.

2. The container carrier assembly of claim 1 wherein said lower carrier portion is provided with a mounting bracket adjacent said upper peripheral edge and including a recess for receiving said one end of said handle portion.

3. The container carrier assembly of claim 2 wherein said recess is provided with a rib extending at least partially along an interior surface of said recess substantially parallel to said vertical axis.

4. The container carrier assembly of claim 3 wherein said one end of said handle portion includes a pivot pin portion receivable in said recess, said pivot pin portion including surface means for engaging said rib to limit pivoting movement of said upper carrier portion about said vertical axis.

5. The container carrier assembly of claim 4 wherein said pivot pin portion and said recess are generally cylindrical in shape, and wherein said surface means are located on a circumferential surface of said pivot pin portion, at locations spaced about 90° relative to each other, to thereby define a first container loading/unloading position and a second container neck engaging position.

6. The container carrier assembly of claim 5 wherein said surface means includes detent means for receiving said rib at said locations to thereby releasably hold said upper carrier portion in either of said first and second positions.

7. The container carrier assembly of claim 5 wherein said container neck engaging portion has a substantially inverted U-shape in plan, and opens in a direction permitting swinging movement of said upper carrier portion between said first and second positions.

8. The container carrier assembly of claim 7 wherein said surface means includes detent means for receiving said rib at said locations to thereby releasably retain said upper carrier portion in either of said first and second positions.

9. The container carrier of claim 1 wherein said container neck engaging portion is substantially inverted U-shape in plan and comprises at least one substantially horizontally extending rib.

10. The container carrier of claim 7 wherein said rib includes a first portion having a radius of curvature substantially equal to a corresponding radius of curvature of said container neck, and second portions extending from opposite ends of said first portion.

11. The container carrier of claim 8 wherein said first portion has an arcuate extent of greater than 270°.

12. The container carrier assembly of claim 10 wherein said container neck engaging portion opens in a direction permitting swinging movement of said upper carrier portion between a first container loading/unloading position and a second container neck engaging position.

13. The container carrier assembly of claim 9 and wherein said container neck engaging portion includes a second container neck engaging rib located above said at least one rib, wherein said first and second ribs are adapted to engage vertically spaced portions of an associated container neck.

14. A container carrier assembly comprising:
(a) a lower carrier portion including a peripheral sidewall, a bottom wall, and an upper peripheral edge;
(b) an upper carrier portion pivotally secured to said lower portion about a vertical axis; said upper carrier portion including a handle portion and a substantially inverted U-shaped container neck engaging portion, said upper carrier portion swingable about said vertical axis between a first position where said upper carrier portion lies outside an area defined by said upper peripheral edge and a second position where said neck engaging portion engages a neck of an associated container.

15. A container carrier assembly according to claim 14 wherein said lower carrier portion includes a bracket adjacent to said upper peripheral edge, said bracket including a recess adapted to receive a pivot pin portion extending downward from said handle portion.

16. A container carrier assembly according to claim 15 wherein said pivot pin portion includes a pin received in an aperture provided at a lower end of said recess.

17. A container carrier assembly according to claim 16 wherein said recess is provided with an elongated stop rib cooperable with stop means on said pivot pin portion to limit pivoting movement of said upper portion between said first and second positions.

18. The container carrier assembly of claim 15 wherein said bracket is formed by a substantially hollow, three sided housing including a top wall and an open bottom; the top wall having an aperture therein which receives a substantially cylindrical sleeve defining said recess.

19. The container carrier assembly of claim 15 wherein a stiffening wall extends between the substantially cylindrical sleeve and said peripheral side wall.

20. The container carrier assembly of claim 15 wherein said lower carrier component is provided with a plurality of apertures in said peripheral side wall.

21. The container carrier assembly according to claim 14 wherein said stop means on said lower end portion of said handle limits said pivoting movement to about 90°.

22. The container carrier assembly according to claim 14 wherein said pivot pin lies in a vertical plane containing a vertical center axis of the container carrier.

23. A container carrier assembly comprising:
(a) a lower carrier portion including a peripheral sidewall, a bottom wall and an upper peripheral edge, said lower carrier portion further comprising a mounting bracket including a recess; and
(b) an upper carrier portion including an elongated handle terminating at an upper end in a container neck engaging portion and at a lower end in a substantially vertically oriented pivot pin portion receivable within said recess.

24. The container carrier according to claim 23 wherein said container neck engaging portion comprises a substantially vertical wall and a first substantially horizontal container engaging rib projecting inwardly from said vertical wall.

25. The container carrier according to claim 24 wherein said first container engaging rib includes a first portion having a radius of curvature substantially equal to a corresponding radius of curvature of said container neck; and second portions extending away from said container neck at opposite ends of said first portion.

26. The container carrier according to claim 25 and wherein said container neck engaging portion includes a second container neck engaging rib above said first container engaging rib, and projecting inwardly from said vertical wall.

27. The container carrier according to claim 23 wherein said upper and lower portions are constructed of relatively rigid plastic material.

28. The container carrier according to claim 23 wherein said lower portion has a plurality of apertures in said peripheral side wall.

29. A container carrier assembly comprising:
(a) a lower carrier portion including a peripheral sidewall, a bottom wall and an upper peripheral edge;
(b) an upper carrier portion including a handle portion pivotable about a vertical axis between a first container loading/unloading position and a second container neck engaging position; and
(c) means for limiting pivotal movement of said upper carrier portion about said vertical axis to movement between said first and second positions, 30. A container and carrier assembly comprising:
(a) a container carrier including a lower portion having a peripheral sidewall, a bottom wall, and an upper peripheral edge; an upper portion including a handle portion having a lower end pivotably secured in said lower portion for swinging movement about a vertical axis, and including a container neck engaging portion at an upper end of the handle portion; and
(b) a flexible and collapsible container adapted to be carried by the carrier assembly, and having a relatively thin peripheral side wall, a bottom wall and a top wall, said top wall having an integrally formed neck portion including closure receiving means formed thereon.

31. The container and carrier assembly according to claim 30 wherein said lower and upper portions are provided with cooperable means for permitting said upper portion to pivotably swing between a first container loading/unloading position and a second container neck engaging position.

32. The container and carrier assembly according to claim 31 wherein said container is provided with a radially outwardly extending flange in said neck portion, adapted to be supported within said container neck engaging portion of said upper carrier portion when said upper carrier portion is in said second position.

33. The container and carrier assembly according to claim 31 wherein said cooperable means includes a mounting bracket on said lower carrier portion and a pivot pin portion at said lower end of said handle portion receivable within said bracket.

34. The container and carrier assembly according to claim 33 wherein said cooperable means limits swinging movement of said upper portion to about 90°.

35. The container and carrier assembly according to claim 33 wherein said cooperable means releasably holds said upper carrier portion in either of said first and second positions.

36. The container carrier of claim 30 wherein said container neck engaging portion is substantially inverted U-shape in plan and comprises at least one substantially horizontally extending rib.

37. The container carrier of claim 36 wherein said rib includes a first portion having a radius of curvature substantially equal to a corresponding radius of curvature of said container neck, and second portions extending from opposite ends of said first portion.

38. The container carrier of claim 37 wherein said first portion has an arcuate extent of greater than 270°.

39. The container carrier assembly of claim 37 wherein said container neck engaging portion opens in a direction permitting swinging movement of said upper carrier portion between a first loading/unloading position and a second container neck engaging position.

40. The container carrier assembly of claim 36 and wherein said container neck engaging portion includes a second container neck engaging rib located above said at least one rib, wherein said first and second ribs are adapted to engage vertically spaced portions of an associated container neck.

* * * * *